United States Patent [19]

Antoon, Jr.

[11] Patent Number: 4,879,078

[45] Date of Patent: Nov. 7, 1989

[54] PROCESS FOR PRODUCING UNIAXIAL POLYOLEFIN/FILLER FILMS FOR CONTROLLED ATMOSPHERE PACKAGING

[75] Inventor: Mitchell K. Antoon, Jr., Wilmington, Del.

[73] Assignee: Hercules Incorporated, Wilmington, Del.

[21] Appl. No.: 167,815

[22] Filed: Mar. 14, 1988

[51] Int. Cl.$^4$ ................................................. B29B 9/06
[52] U.S. Cl. ........................................ 264/41; 264/102; 264/143; 264/154; 264/210.6; 264/211.12; 264/288.8
[58] Field of Search ..................... 264/143, 41, 210.6, 264/211, 211.12, 288.8, 102, 154

[56] References Cited

U.S. PATENT DOCUMENTS

| | | | |
|---|---|---|---|
| 3,844,865 | 10/1974 | Elton et al. | 264/210.6 |
| 3,903,234 | 9/1975 | Ikeda et al. | 264/288.8 |
| 3,975,455 | 8/1976 | Falender et al. | 264/288.8 |
| 4,153,659 | 5/1979 | Recktenwald et al. | 264/102 |
| 4,350,655 | 9/1982 | Hoge | 264/210.6 |
| 4,698,372 | 10/1987 | Moss | 264/288.8 |
| 4,704,238 | 11/1987 | Okuyama et al. | 264/288.8 |
| 4,705,812 | 11/1987 | Ito et al. | 264/288.8 |
| 4,705,813 | 11/1987 | Ito et al. | 264/288.8 |

FOREIGN PATENT DOCUMENTS

| | | | |
|---|---|---|---|
| 61-264031 | 11/1986 | Japan | 264/288.8 |
| 62-10141 | 1/1987 | Japan | 264/288.8 |
| 62-27438 | 2/1987 | Japan | 264/288.8 |
| 62-288640 | 12/1987 | Japan | 264/288.8 |

*Primary Examiner*—Jeffery Thurlow
*Attorney, Agent, or Firm*—David Edwards

[57] ABSTRACT

A uniaxially oriented, polyolefin film is prepared by melt blending a mixture of a polyolefin, an inert filler, a processing aid such as calcium stearate, and optionally a stabilizer, maintaining the moisture level in the melt blend below 700 ppm, casting a film, and uniaxially stretching the film at least about 2 times its original casting dimensions in one direction until the film has a sufficient number of elongated, narrow shaped, microporous voids in order to create a $CO_2$ and $O_2$ permeance in the range of 5,000 to 10,000,000 cc/$100^2$-atm-day. Such a film is used in a controlled atmosphere packaging container as a panel in a window for a controlled flow or flux of $CO_2$ and $O_2$ through its wall in an otherwise gas impermeable container.

7 Claims, No Drawings

PROCESS FOR PRODUCING UNIAXIAL POLYOLEFIN/FILLER FILMS FOR CONTROLLED ATMOSPHERE PACKAGING

BACKGROUND OF THE INVENTION

This invention relates to a uniaxially oriented polymeric film having an inert filler dispersed therein, a process for preparing such a film, and the use of such film in controlled atmosphere storage containers for fresh fruits and vegetables.

Maintaining the flavor, texture, and eating qualities of fresh fruits and vegetables and extending the shelf life of flowers (hereinafter "produce" collectively) from the time of harvest through the time of consumption is an obvious problem. The most commonly used technique has been refrigeration. Some items, such as tomatoes, bananas, and citrus fruits, are routinely picked in a less-than-ripe condition and stored at reduced temperatures until they are sold. Other products, such as grapes and lettuce, are picked at maturity and refrigerated. The reduced temperature helps to retard further ripening, but only for relatively short time periods and may be detrimental to the keeping quality of the product after it is exposed to room temperature.

For each produce type an optimum range of concentrations of $CO_2$ and $O_2$ exists at which its respiration is retarded and quality is improved to the greatest extent. For instance, some produce benefit 10 from relatively high levels of $CO_2$, e.g., strawberries and mushrooms, while others such as lettuce and tomatoes store better at lower levels of $CO_2$. Likewise, each produce type also has its own individual respiration rate, which can be expressed as cubic centimeters of oxygen per kg/hour.

It is known that the maturation-rate of produce can be reduced by controlling the atmosphere surrounding the produce so that an optimum $O_2$ range and relative concentrations of $CO_2$ to $O_2$ are maintained. For example, U.S. patent application Ser. No. 123,465 (Anderson 1-2-3 case), filed Nov. 20, 1987 discloses a packaging container for controlling the atmosphere during storage of produce to improve retention of the product's freshness by adjusting the $CO_2$ to $O_2$ ratio; the environment is controlled by providing a biaxially oriented membrane panel of limited $CO_2$ and $O_2$ permeance in an otherwise substantially impermeable container. Other controlled atmosphere packaging containers are disclosed in U.S. Pat. Nos. 3,102,777 and 3,450,542 and publication entitled "Controlling Atmosphere in a Fresh-Fruit Package" by P. Veeraju and M. Karel, Modern Packaging, Vol. 40, #2 (1966), pages 168, 170, 172, 174, and 254.

It is also known that thermoplastic polymers can be filled with inert fillers, cast into sheets, and stretched to form an oriented thermoplastic film. Examples of such methods are disclosed, for example, in U.S. Pat. Nos. 3,903,234, 3,773,608, 4,359,497, and 4,626,252 and British Pat. No. 2,151,538 A. The ingredients and process parameters used determine the characteristics of the resulting product. Hence, a wide range of products have been produced depending on the needs of the industry. In the packaging industry a need still exists for producing a microporous film having highly consistent $CO_2$ and $O_2$ permeances throughout the film and a wide processing window.

None of the above mentioned prior art discloses the instant invention.

Note that a more accurate measurement of the ingredients in the composition of the instant invention is by volume rather than by weight because the densities of the ingredients differ significantly. For example, hollow glass beads are extremely low density while $CaCO_3$ is relatively heavy compared to the hollow glass beads. In the same manner $BaSO_4$ has yet a relatively different weight per unit volume than both the glass beads and $CaCO_3$. Other materials having different densities would also vary significantly by weight while their volume requirements would remain relatively close for optimum effectiveness in the instant invention. Hence, while a weight basis percentage range would have to be extremely wide to encompass all of these ingredients, a percentage by volume range would remain narrow. Both measurements are provided throughout this application except for the claims for the sake of comparison.

SUMMARY OF THE INVENTION

This invention is directed to a process for preparing a controlled atmosphere packaging (CAP) film having a consistent permeance throughout the film and a wide processing window by (a) melt blending in a vessel in a temperature range of 150°–300° C. the ingredients
 (i) 36–60% by weight (or 64–84% by volume) of a polymer selected from the group of homopolymer, copolymer, or blends thereof of alpha-monoolefins having 2 to 10 carbons, poly(ethylene terephthalate), poly(butylene terephthalate), nylon, polystyrene, ethylene-vinyl acetate copolymers, ethylene-methacrylic acid copolymers, ethylene-vinyl alcohol copolymers, and polycarbonate,
 (ii) about 36 to 60% by weight (or 15–34% by volume) of an inert filler based on the weight of the polymer and filler, said filler having an average particle size of about 0.3 to 14 microns,
 (iii) about 0.1 to 2.5% by weight (or 0.2–5% by volume) of calcium stearate, and
 (iv) 0 to 1.5% by weight (or 0–3% by volume) of a stabilizer,
(b) maintaining the moisture level in the melt blend below 700 ppm,
(c) casting a film,
(d) cooling the film to a temperature below the melting point of the film,
(e) uniaxially stretching the film at least about two times its original casting dimensions in one direction with the temperature of the film during stretching being within the temperature range which is above the line-drawing temperature and below the melting temperature of the polymer, until the film has a sufficient number of elongated narrow shaped voids in order to create a $CO_2$ and $O_2$ permeance in the film in the range of 5,000 to 10,000,000 cc/100 in$^2$-atm-day with a standard deviation of the permeance in the range of less than 35%, and preferably less than 20%, and
(f) cooling the film to room temperature.

This invention also comprehends a container using the film prepared by the above mentioned process wherein the film is a panel in at least one side of said container.

DETAILED DESCRIPTION OF THE INVENTION

The CAP film of the present invention is prepared from a polymer having dispersed therein an inert filler. Useful polymers include homopolymers, copolymers, and blends thereof of alpha-monoolefins having 2 to 10 carbons, preferably 2 to 5 carbons.

Examples of homopolymers that can be used in the present invention are polyethylene, polypropylene, poly(1-butene), poly(3-methyl-1-butene), poly(3-methyl-1-pentene), poly(3-methyl-1-hexene), poly(4-methyl-1-hexene), and poly(4,4-dimethyl-1-hexene).

Examples of copolymers that can be used in the present invention are ethylene/propylene, ethylene/1-butene, ethylene/1-pentene, ethylene/1-hexene, ethylene/1-octene, ethylene/1-heptene, ethylene/1-nonene, and ethylene/1-decene.

Examples of other homo- and copolymers that can be used in the present invention are polyolefins, poly(ethylene terephthalate), polya(butylene terephthalate), nylon, polystyrene, ethylene-vinyl acetate copolymers, ethylene-methacrylic acid copolymers (ionomers), ethylene-vinyl alcohol copolymers, and polycarbonate.

Examples of blends thereof that can be used in the present invention are blends of homopolymers such as polyethylene and polypropylene or blends of a homopolymer and a copolymer such as polyethylene blended with ethylene/octene or ethylene/decene. Blends of two copolymers such as ethylene/1-octene and ethylene/1-butene can also be used.

Fillers that can be used in this invention should be inorganic and inert to the polymer, have a relatively low interfacial surface tension making it practically noncohesive toward the polymer matrix, have an average particle size of about 0.3 to 14 microns, and be present in the amount of about 36 to 60 weight percent, preferably 40–55%, (on a volume basis 15–34% by volume, preferably 18–29% by volume) based on the total amount of polymer and filler present. Average particle size of a filler material is determined by a Coulter counter method or by microscopy.

Inert inorganic fillers that can be used in this invention include calcium carbonate, silica, diatomaceous earth, barium sulfate, titanium dioxide, and clays. Preferred fillers are calcium carbonate, silica, and barium sulfate.

An important component of the composition of the film of this invention is the processing aid such as calcium stearate, zinc stearate, oleic acid, and stearic acid; this component is used in high levels in order to obtain uniaxially oriented film at the high filler loading levels; from about 0.1 to about 2.5% by weight (or 0.2–5% by volume) of the calcium stearate is used in the invention. An antioxidant stabilizer is optional in the film of the present invention. Examples of antioxidants that can be used in the present invention are tetrakis(methylene(3,5-di-t-butyl-4-hydroxyhydrocinnamate))methane (this antioxidant is marketed commercially under the trademark IRGANOX 1010), tris(2,4-di-t-butylphenyl)phosphite (marketed commercially under the trademark IRGAPHOS 168), dilaurylthiodipropionate (this is a thioester), and N,N'-diphenyl-p-phenylenediamine (an aryl amine). Up to 0.50% by weight (or up to 2% by volume) may be used in the film.

The composition of this invention can be prepared by conventional blending techniques using such equipment as two-roll mills, Banbury mixers, twin-screw extruders, or shell blenders. The polymeric ingredients may be mixed together in a first step and then the other ingredients added into the blend. Alternately, the entire blending operation can be performed in a single step.

After the ingredients of the composition of this invention have been melt blended, the moisture level of this blend is then maintained below 700 parts per million (ppm) (preferably below 300 ppm). A preferred method for maintaining the moisture content at the desired levels is to cool extruded strands on a moving conveyor belt using flowing air. This air-cooling method yields strands and pellets which have residual moisture levels far below the levels achieved by the water-bath-cooling process typical in the industry.

The accompanying table demonstrates that the less time the extruded strands are in contact with liquid water, the lower is the residual moisture content of the pellets produced. Low residual moisture content in the pellets in turn gives rise to a low moisture level within the melt in the extruder which feeds the die. Finally, the low moisture level in the melt allows the formation of a smooth casting which can be oriented uniaxially at least 5 times its original length, and preferably at least 6.5 times its original length. Thus, the following Table A shows that air-cooling without moisture contact gives the driest pellets, the smoothest casting, and the most highly-oriented and smooth film.

TABLE A

| Extrudate Cooling Method | Residual $H_2O$ ppm | Casting Appearance | Maximum Uniaxial Stretch at 110° C. Without Holes | Film Appearance |
| --- | --- | --- | --- | --- |
| Water bath - 11 sec | 773 ± 6 | Very rough | 2.5 X | Very rough; narrow thin spots. |
| Water bath - 11 sec + air blower to remove droplets | 771 ± 41 | Rough | 5 X | As about but less severe. |
| Water bath - 2.5 sec + air blower | 129 ± 27 | Almost smooth | 5.5 X | Smoother; minor thin spots. |
| Air cooling only | 115 ± 2 | Smoothest | 6.5 X minimum | Smoothest. |

Another process of maintaining the desired moisture level is to employ vacuum-drying in order to reduce the moisture level in too-wet pellets to acceptable levels (below 700 ppm, and preferably below 300 ppm). In this case, pellets composed of polymer plus filler would be made using a water-bath-cooling process such that the residual moisture level is excessive. These too-wet pellets can be subjected to a partial vacuum, preferably with some heating to speed the process, for a period of time until the moisture content is within acceptable limits as defined above. This process works but is not the preferred one since an extra process, vacuum-drying, is required.

Yet another process of maintaining the desired moisture level is by charging the hot melt directly to the extruder which extrudes the casting from a die. In this case, the molten composition is never exposed to liquid water and, thus, has a low residual moisture level as defined above. Therefore, a smooth and highly-orientable casting will be formed.

To accurately achieve this moisture level, sensitive moisture measurement techniques are required. For example, a Coulometric Karl Fischer titration method (using the Brinkman Model 652 RF Coulometer) was used successfully for verifying the desired moisture level in the formulations. The strands were then pelletized using conventional techniques in the industry.

The composition of the present invention can be formed into a sheet or film by any of the techniques commonly available to the converter, such as flat die extrusion, blown film extrusion, or extrusion into a calendering stack. For special applications, sheets may be also fabricated by compression or injection molding.

A crucial feature of the present invention is the necessity for specific conditions of stretching, in order to obtain the desired altered surface and microporous properties. Stretching of plastic films is well known in the art and is commonly conducted for the purpose of obtaining molecular orientation leading to improved physical properties such as increased tensile modulus, reduced elongation, and often increased tensile strength. It is known that in order to orient crystalline polymers such as polyethylene and polypropylene in practice, stretching must be conducted within a fairly well defined range of temperatures, commonly designated as the "orientation temperature range". This temperature is approximately equivalent to temperatures above which the crystallites begin to melt, but below the temperature at which crystallites are no longer discernible. The method of the present invention requires that the stretching be conducted at temperatures, depending on the polymer, from about 20° C. to about 160° C.

When stretched monoaxially, the film exhibits a higher tensile strength in the direction of stretching, i.e., the machine direction, than in the transverse direction. Stretching breaches the bond between the polymer matrix and the inert filler creating voids (i.e., micropores) in the polymer matrix and a fibrous surface with ruptures on the surface of the film. Increasing the stretch ratio within the limits of the film increases the number and size of voids in the polymer matrix causing an increase in the opacity of the film and a decrease in the density. There can be a continuous path through the film only when the voids are large enough and numerous enough to provide enough interconnections to create a continuous pathway for gas flow through the film. Due to the long narrow pore shapes in uniaxial polypropylene film loaded with $CaCO_3$, it makes sense that the degree of interconnectivity of pores tends to be much lower than for a similar film stretched in both directions. The interconnectivity and thus the permeability should of course increase with increasing stretching since the pores become longer.

The uniaxially oriented plastic film of the present invention has $O_2$ permeances in the range of 5,000 to 10,000,000 cc/100 in$^2$-atm-day and $CO_2:O_2$ gas separation ratio of about 1. The uniaxial orientation process makes the processing window at least 50° C. wide. In other words, in each case the film permeability can be controlled by adjusting the uniaxial orientation temperature and degree of orientation in a broad range.

The uniaxial film of this invention was found to be uniquely adapted for use in controlled atmosphere packaging containers where the atmosphere inside the container is controlled by the use of this film as a gas-permeable panel in a window in one or more of the container's walls; the container otherwise is constructed of a substantially gas-impermeable material. This film provides a controlled flow or flux of $CO_2$ and $O_2$ through its wall at a permeance of 5,000–10,000,000 cc/100 in$^2$-atm-day and a $CO_2:O_2$ ratio of 1. The permeance and area of the panel (membrane) of the container is such as to provide a flux of $O_2$ and $CO_2$ approximately equal to the predicted $O_2$ respiration rate for not more than 3.0 kg (6.6 lb) of enclosed fruit, vegetable, or flower.

The ability to control the atmosphere within the container is derived not only from the ability to adjust the area of the permeable plastic membrane that allows communication between the interior and exterior of the container, but also from the ability to select the permeance of the panel to adapt a variety of product of fresh fruits, vegetables and flowers. For a more detailed discussion of the container in which the microporous film of this invention can be used, see U.S. patent application Ser. No. 123,465 of H. S. Anderson, filed Nov. 20, 1987, which application is incorporated herein by reference.

EXAMPLES 1–5

In each of the following examples, the CAP film was prepared by melt blending in a mixer a polymer, an inert filler, a processing aid, and a stabilizer, extruding the melt blend into strands, cooling the strands so as to maintain the moisture level in them below 700 ppm, pelletizing the strands, casting a film from the strands, cooling the film to a temperature below the melting point of the film, and uniaxially orienting the film in a T. M. Long stretcher or forward draw unit. The film was stretched down to a thickness of about 6.0;14 6.5 mils (13.5 mils for Example 5). For Examples 4 and 5 the blend was pelletized in a twin screw extruder and later extruded through a 16-inch wide slit die (6 inch wide slit due for Example 5) at a melt temperature of 261° C. (217° C. for Example 4 and 250° C. for Example 5) to form a casting. The results are recorded in Table 1, infra. The particle sizes of the filler in these Examples were 3 microns average. Similar results were also obtained using particle sizes of filler of 1 micron and 12 microns using the T. M. Long stretcher.

TABLE 1

|  | 1 | 2 | 3 | 4 | 5 |
|---|---|---|---|---|---|
| Pro-fax ® 6501 (Polypropylene) (Himont Co.) mp 164° C., Den 0.903 g/cc | 24.82 wt % (37.1 vol %) | 24.82 wt % (37.1 vol %) | 24.82 wt % (37.1 vol %) |  |  |
| Pro-fax ® SA841(ethylene-propylene copolymer) (2.7 mole % ethylene, mp 156° C., den 0.90 g/cc) | 24.82 wt % (37.2 vol %) | 24.82 wt % (37.2 vol %) | 24.82 wt % (37.2 vol %) |  |  |
| Atomite ® $CaCO_3$ (Cyprus Ind. Minerals) (Den 2.71 g/cc) | 49.64 wt % (24.7 vol %) | 49.64 wt % (24.7 vol %) | 49.64 wt % (24.7 vol %) | 50 wt % (25.2 vol %) | 45.0 wt % (21.8 vol %) |
| Calcium Stearate (Processing Aid) (Den. 1.03 g/cc) | 0.50 wt % (0.65 vol %) | 0.50 wt % (0.65 vol %) | 0.50 wt % (0.65 vol %) | 1.07 wt % (1.42 vol %) | 0.96 wt % (1.22 vol %) |
| B-225 Stabilizer (Ciba-Geigy) (Antioxidant) (Den. 1.09 g/cc) | 0.22 wt % (0.28 vol %) | 0.22 wt % (0.28 vol %) | 0.22 wt % (0.28 vol %) |  |  |
| Polybutylene 1710A (Shell Chemical Co.) (Den. 0.909 g/cc) |  |  |  | 48.93 wt % (73.4 vol %) |  |
| Dowlex ® 2045 LLDPE (Dow Chemical Co.) |  |  |  |  | 54.04 wt % |

TABLE 1-continued

|  | 1 | 2 | 3 | 4 | 5 |
| --- | --- | --- | --- | --- | --- |
| (Melt index 1.0, den. 0.920 g/cc) |  |  |  |  | (77 vol %) |
| Uniaxial Orientation | 5X at 135° C. | 6X at 125° C. | 6X at 145° C. | 3.5X at 50° C. | 4X at 20° C. |
| Casting Thickness (mil) | 20–25 | 20–25 | 20–25 | 27.5–31 | 20 |
| $O_2$ Permeance cc/100 in$^2$-atm-day | 679,000 | 1,158,000 | 341,000 | 15,300 | 203,000 |
| $CO_2$ Permeance cc/100 in$^2$-atm-day | 651,000 | 1,108,000 | 327,000 |  |  |

For the sake of comparison, the same composition as in Examples 1-3 was given a biaxial orientation at a series of tenter oven temperatures. In each case the casting was first oriented in the forward direction 5X at setting temperature 120° C. A 3.5X (approx.) transverse draw was then applied at the series of temperatures listed below. (In each case the temperature quoted was the "setting" temperature for the stretching zone of the tenter). The oxygen permeances, as shown below, are much too high at most orientation temperatures; at high orientation temperature the permeability falls abruptly to a very low level in a very narrow temperature interval.

| CD Orientation Setting Temp (C.) | $O_2$ Permeance cc/100 in$^2$-atm-day |
| --- | --- |
| 154 | 32,500,000 |
| 160 | 17,900,000 |
| 166 | 8,940,000 |
| 171 | 2,230,000 |
| 175 | less than 5000; film was melting and changing from opaque to translucent |

EXAMPLES 6-8

Quantities of mushrooms were placed in tightly-sealed glass vessels held at 4° C. in a refrigerator. The internal atmosphere of the vessels communicated with the external atmosphere only through a microporous film panel of the uniaxially oriented film of Examples 1-3; the circular panel covered an aperture in the top of the glass vessels. The initial gas composition in the vessels was about 21% by volume of $O_2$, about 0.03% of $CO_2$, and about 78% of $N_2$. The results of these tests are reported in Table 2, below.

TABLE 2

|  | 6 | 7 | 8 |
| --- | --- | --- | --- |
| Panel Composition | Example 1 | Example 2 | Example 3 |
| Panel Thickness (mil) | 6.5 | 6.5 | 6.0 |
| Panel Area (in$^2$) | 2.0 | 1.0 | 4.0 |
| Panel $O_2$ Permeance (cc/100 in$^2$-atm-day) | 679,000 | 1,158,000 | 341,000 |
| Panel $CO_2$ Permeance (cc/100 in$^2$-atm-day) | 651,000 | 1,108,000 | 327,000 |
| Amount of Mushrooms (g) | 403.2 | 328.1 | 404.3 |
| Gas in vessel after 7 days |  |  |  |
| $O_2$% by Volume | 13.5 | 15 | 15.5 |
| $CO_2$% by Volume | 8 | 8 | 8 |
| Appearance after 7 days @ 4° C. | Improved white and edible | Improved white and edible | Improved white and edible |
| Control (stored in open air) after 7 days at 4° C. | Brown and inedible | Brown and inedible | Brown and inedible |

What is claimed:

1. A process for preparing a controlled atmosphere packaging film having a consistent permeance throughout the film and a wide processing window by
    (a) melt blending in a vessel in a temperature range of 150°–300° C. the ingredients
        (i) 64–84% by volume of a polymer selected from the group of homopolymer, copolymer, or blends thereof of alpha-monoolefins having 2 to 10 carbons, poly(ethylene terephthalate), poly(butylene terephalate), nylon, polystyrene, ethylene-vinyl acetate copolymers, ethylene-methacrylic acid copolymers, ethylene-vinyl alcohol copolymers, and polycarbonate,
        (ii) about 15–34% by volume of an inert filler based on the weight of the polymer and filler, said filler having an average particle size of about 0.3 to 8 microns,
        (iii) about 0.2–5% by volume of a processing aid selected from calcium stearate, zinc stearate, oleic acid, and stearic acid, and
        (iv) 0 to 3% by volume of a stabilizer,
    (b) maintaining the moisture level in the melt blend below 700 ppm,
    (c) casting a film,
    (d) cooling the film to a temperature below the melting point of the film,
    (e) uniaxially stretching the film at least two times its original casting dimensions in one direction with the temperature of the film during stretching being within the temperature range which is above the line-drawing temperature and below the melting temperature of the polymer, until the film has a sufficient number of elongated, narrow shaped, microporous voids in order to create a $CO_2$ and $O_2$ permeance in the film in the range of 5,000 to 10,000,000 cc/100 in$^2$-atm-day with a standard deviation of the permeance in the range of less than 35%, and
    (f) cooling the film to room temperature.

2. The process of claim 1 wherein the step (b) of maintaining the moisture level in the melt blend below 700 ppm is performed by either (i) extruding the melt blend into strands, cooling the strands in a water bath or with flowing air, and pelletizing the strands, or (ii) directly casting the hot melt blend into a film.

3. The process of claim 2 wherein the inert filler is selected from calcium carbonate, silica, diatomaceous earth, barium sulfate, titanium dioxide and clays.

4. The process of claim 3 wherein the inert filler is calcium carbonate.

5. The process of claim 4 wherein the stabilizer is an antioxidant selected from tetrakis(methylene(3,5-di-t-butyl-4-hydroxyhydrocinnamate))methane, tris(2,4-di-t-butylphenyl)phosphite, dilaurylthiodipropionate, or N,N'-diphenyl-p-phenylenediamine.

6. The process of claim 5 wherein the moisture level in the melt blend is maintained below 300 ppm.

7. The process of claim 6 wherein the ratio of the permeance of the $CO_2$ and $O_2$ in the film is 1.

* * * * *

UNITED STATES PATENT AND TRADEMARK OFFICE
CERTIFICATE OF CORRECTION

PATENT NO. : 4,879,078
DATED : NOVEMBER 7, 1989
INVENTOR(S) : ANTOON, Jr.

It is certified that error appears in the above-identified patent and that said Letters Patent is hereby corrected as shown below:

Column 4, Line 40

"As about" should read --As above--

Column 6, Line 26

"product" should read --produce--

Column 6, Line 43

"about 6.0;14 6.5 mils" should read --about 6.0-6.5 mils-

Signed and Sealed this

Thirteenth Day of November, 1990

Attest:

HARRY F. MANBECK, JR.

Attesting Officer     Commissioner of Patents and Trademarks